United States Patent
Rizzo et al.

(10) Patent No.: US 9,134,913 B2
(45) Date of Patent: Sep. 15, 2015

(54) METHODS AND STRUCTURE FOR IMPROVED PROCESSING OF I/O REQUESTS IN FAST PATH CIRCUITS OF A STORAGE CONTROLLER IN A CLUSTERED STORAGE SYSTEM

(75) Inventors: James A. Rizzo, Austin, TX (US); Vinu Velayudhan, Fremont, CA (US); Adam Weiner, Henderson, NV (US); Gerald E. Smith, Niwot, CO (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 570 days.

(21) Appl. No.: 13/432,213

(22) Filed: Mar. 28, 2012

(65) Prior Publication Data

US 2013/0067125 A1    Mar. 14, 2013

Related U.S. Application Data

(60) Provisional application No. 61/532,585, filed on Sep. 9, 2011.

(51) Int. Cl.

| | |
|---|---|
| G06F 13/12 | (2006.01) |
| G06F 15/16 | (2006.01) |
| G06F 3/06 | (2006.01) |
| G06F 13/28 | (2006.01) |
| G06F 13/42 | (2006.01) |

(52) U.S. Cl.
CPC .............. *G06F 3/0631* (2013.01); *G06F 3/065* (2013.01); *G06F 3/067* (2013.01); *G06F 3/0613* (2013.01); *G06F 3/0635* (2013.01); *G06F 3/0683* (2013.01); *G06F 13/12* (2013.01); *G06F 13/28* (2013.01); *G06F 13/423* (2013.01); *G06F 2206/1012* (2013.01); *Y02B 60/1228* (2013.01)

(58) Field of Classification Search
CPC .......................... G06F 2212/7201; G06F 3/067
USPC ........................................................... 710/38
See application file for complete search history.

(56) References Cited

U.S. PATENT DOCUMENTS

| | | | |
|---|---|---|---|
| 6,105,080 A | 8/2000 | Holt et al. | |
| 6,487,646 B1 | 11/2002 | Adams et al. | |
| 6,651,154 B1 | 11/2003 | Burton et al. | |
| 6,738,870 B2 * | 5/2004 | Van Huben et al. | 711/150 |

(Continued)

OTHER PUBLICATIONS

"Common RAID Disk Data Format Specification" Version 2.0 Revision 19 SNIA Technical Position Mar. 27, 2009.

(Continued)

*Primary Examiner* — Titus Wong
(74) *Attorney, Agent, or Firm* — Duft Bornsen & Fettig

(57) ABSTRACT

Methods and structure for improved processing of fast path I/O requests in a clustered storage system. In a storage controller of a clustered storage system, the controller comprises a fast path I/O request processing circuit tightly coupled with host system drivers for fast processing of requests directed to storage devices of a logical volume. The controller also comprises a logical volume I/O processing stack (typically implemented as programmed instructions) for processing I/O requests from a host system directed to a logical volume. Based on detecting a change of ownership of a device or volume and/or a change to logical to physical mapping of a logical volume, fast path I/O requests may be converted to logical volume requests based on mapping context information within the fast path I/O request and shipped within the clustered storage system for processing.

20 Claims, 6 Drawing Sheets

(56) References Cited

U.S. PATENT DOCUMENTS

| | | | |
|---|---|---|---|
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,082,390 B2 * | 7/2006 | Bergsten | 703/21 |
| 7,213,102 B2 | 5/2007 | Buchanan, Jr. et al. | |
| 7,237,036 B2 * | 6/2007 | Boucher et al. | 709/245 |
| 7,418,550 B2 | 8/2008 | Hetrick et al. | |
| 7,480,941 B1 | 1/2009 | Balasubramaniam et al. | |
| 7,814,065 B2 | 10/2010 | Chan et al. | |
| 7,971,094 B1 | 6/2011 | Benn et al. | |
| 8,001,242 B2 | 8/2011 | Mild et al. | |
| 8,041,735 B1 | 10/2011 | Lacapra et al. | |
| 8,190,816 B2 | 5/2012 | Balasubramanian | |
| 8,261,003 B2 | 9/2012 | Young et al. | |
| 8,370,571 B2 * | 2/2013 | Mazina | 711/114 |
| 8,380,885 B1 | 2/2013 | Natanzon | |
| 2002/0103964 A1 | 8/2002 | Igari | |
| 2004/0148477 A1 | 7/2004 | Cochran | |
| 2004/0205074 A1 | 10/2004 | Berkery et al. | |
| 2005/0080874 A1 | 4/2005 | Fujiwara | |
| 2005/0097324 A1 | 5/2005 | Mizuno | |
| 2005/0125557 A1 | 6/2005 | Vasudevan et al. | |
| 2005/0188421 A1 | 8/2005 | Arbajian | |
| 2005/0240928 A1 | 10/2005 | Brown et al. | |
| 2006/0080416 A1 | 4/2006 | Gandhi | |
| 2006/0143506 A1 * | 6/2006 | Whitt et al. | 714/6 |
| 2007/0015589 A1 | 1/2007 | Shimizu | |
| 2007/0067497 A1 | 3/2007 | Craft et al. | |
| 2007/0088928 A1 * | 4/2007 | Thangaraj et al. | 711/163 |
| 2007/0210162 A1 | 9/2007 | Keen et al. | |
| 2009/0119364 A1 | 5/2009 | Guillon | |
| 2009/0222500 A1 | 9/2009 | Chiu et al. | |
| 2010/0185874 A1 | 7/2010 | Robles et al. | |
| 2010/0191873 A1 | 7/2010 | Diamant | |
| 2010/0250699 A1 | 9/2010 | Brown | |
| 2010/0274977 A1 | 10/2010 | Schnapp et al. | |
| 2011/0072228 A1 | 3/2011 | Nagata | |
| 2011/0178983 A1 | 7/2011 | Bernhard et al. | |
| 2011/0225371 A1 | 9/2011 | Spry | |
| 2012/0159646 A1 | 6/2012 | Hong Chi et al. | |
| 2012/0216299 A1 | 8/2012 | Frank | |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

METHODS AND STRUCTURE FOR IMPROVED PROCESSING OF I/O REQUESTS IN FAST PATH CIRCUITS OF A STORAGE CONTROLLER IN A CLUSTERED STORAGE SYSTEM

BACKGROUND

1. Field of the Invention

The invention relates generally to clustered storage systems and more specifically relates to methods and structure for direct pass through of "fast path" I/O requests in a clustered storage system.

2. Related Patents

This patent application is related to the following commonly owned United States patent applications, all filed on the same date herewith and all of which are herein incorporated by reference:

U.S. patent application Ser. No. 13/432,131, entitled METHODS AND STRUCTURE FOR TASK MANAGEMENT IN STORAGE CONTROLLERS OF A CLUSTERED STORAGE SYSTEM;

U.S. patent application Ser. No. 13/432,223, entitled METHODS AND STRUCTURE FOR LOAD BALANCING OF BACKGROUND TASKS BETWEEN STORAGE CONTROLLERS IN A CLUSTERED STORAGE ENVIRONMENT;

U.S. patent application Ser. No. 13/432,225, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;

U.S. patent application Ser. No. 13/432,232, entitled METHODS AND STRUCTURE FOR IMPLEMENTING LOGICAL DEVICE CONSISTENCY IN A CLUSTERED STORAGE SYSTEM;

U.S. patent application Ser. No. 13/432,238, entitled METHODS AND STRUCTURE FOR IMPROVED I/O SHIPPING IN A CLUSTERED STORAGE SYSTEM;

U.S. patent application Ser. No. 13/432,220, entitled METHODS AND STRUCTURE FOR MANAGING VISIBILITY OF DEVICES IN A CLUSTERED STORAGE SYSTEM;

U.S. patent application Ser. No. 13/432,150, entitled METHODS AND STRUCTURE FOR IMPROVED BUFFER ALLOCATION IN A STORAGE CONTROLLER; and U.S. patent application Ser. No. 13/432,138, entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

Some clustered storage systems provide storage controllers tightly coupled with corresponding drivers in attached host systems (e.g., in a system such as that of FIG. 2 in which the storage controllers are tightly coupled with a driver of a corresponding host system—i.e., where the storage controller is an HBA within the host system). In some such controllers, the storage controller provides multiple types of interface capabilities (i.e., multiple APIs). A first standard interface may be provided wherein the driver constructs an I/O request directed to a logical volume (e.g., directed to a RAID logical volume). The I/O request addresses logical block addresses of the logical volume. The storage controller then uses a mapping structure within the controller to map the I/O request to corresponding physical storage locations on the one or more storage devices that comprise the logical volume. For these requests, the storage controller also manages all related redundancy computations and management of associated redundancy information (i.e., for RAID logical volumes). The storage controller also manages computations related to mapping from logical addresses of the identified logical volume to physical addresses or affected storage devices.

Although these storage controllers can provide significant computational power to perform the requisite logical to physical mapping and any required redundancy computations, it is often the case that the host systems possess significantly more computational resources and power than do any of the multiple storage controllers of the clustered storage system. Thus, in such tightly coupled driver-controller configurations, the storage controller may also provide an optional bypass mechanism so that the driver software on an attached host system may perform the logical to physical mapping computations and may also provide the redundancy computations to help manage associated redundancy information. For example, in some LSI Corporation storage controllers such a bypass mechanism is referred to as a "fast path" interface. In these controllers, the "fast path" driver software of the attached host system constructs I/O requests destined directly to the relevant physical locations of the physical storage devices coupled with the storage controller. The storage controller providing such a "fast path" option provides the driver software with essentially the same mapping information that the storage controller uses for mapping logical addresses of a logical volume to physical addresses of the storage devices of the volume. Fast path enabled LSI storage controllers and circuits generally implement the "fast path" as a custom designed circuit that can process the driver's I/O requests to physical storage devices very quickly (since the controller need not perform the mapping and RAID redundancy computations).

As noted above, in clustered storage systems, a corresponding one of the storage controllers of the cluster owns each particular logical volume configured in the cluster (provisioned by the plurality of storage devices). As further noted above, ownership of a logical volume may be transferred among the plurality of storage controllers for a variety of reasons (i.e., by cooperative information exchanges among the controllers to balance the processing load among the controller or in the case of a planned or unplanned failover of a storage controller). When ownership of a volume is transferred from one controller to another, the mapping/ownership information in the driver software of attached host systems is eventually updated by some attached storage controller to indicate an appropriate storage controller to which standard logical volume requests are to be directed as well as to which physical storage devices "fast path" requests are to be directed. However, it is a problem if the driver has already issued a number of "fast path" requests after the storage controllers have transferred ownership of a volume and/or some storage devices but prior to receiving an update of the mapping information. Further, the driver software of a host system may continue to issue requests (via the standard RAID path or the "fast path" to the storage controller) before receiving its update of the mapping structures. Prior controller architectures may simply return an error status for such I/O requests that are generated based on "stale" mapping information in the driver software of the host system. Such an error could trigger error recovery procedures that may negatively impact overall performance of the clustered storage system and may cause confusion for a user/administrator.

Thus it is an ongoing challenge to manage I/O requests (logical volume requests or "fast path" requests) issued by a driver of a host with outdated or stale mapping/ownership information.

SUMMARY

The present invention solves the above and other problems, thereby advancing the state of the useful arts, by providing methods and structure for improved processing of fast path I/O requests in a clustered storage environment. In a storage controller of a clustered storage system, the controller comprises a fast path I/O request processing circuit tightly coupled with host system drivers for fast processing of requests directed to storage devices of a logical volume. The controller also comprises a logical volume I/O processing circuit for processing I/O requests from a host system directed to a logical volume. Responsive to changes of configuration information relating to devices or volumes within the clustered storage system, fast path I/O requests may be shipped from one controller to another. In some embodiments, the fast path request is converted to a logical volume request based on mapping context information within the fast path I/O request.

In one aspect hereof, a method is provided that is operable in a first storage controller of a clustered storage system comprising a plurality of interconnected storage controllers. The first storage controller comprises a logical volume I/O request processing stack implemented as software executed by the first storage controller and further comprises a fast path I/O request processing circuit. The method comprises receiving in the first storage controller a fast path I/O request from an attached host system. The request is directed to a device identified by a device identifier in the received I/O request. The method then determines whether the fast path I/O request can be processed by the fast path I/O request processing circuit of the first storage controller. Responsive to determining that the fast path I/O request processing circuit of the first storage controller can process the fast path I/O request, the method processes the fast path I/O request by operation of the fast path I/O request processing circuit of the first storage controller. Responsive to determining that the fast path I/O request processing circuit of the first storage controller cannot process the fast path I/O request, the method transfers the request within the clustered storage system for processing to completion.

Another aspect hereof provides a storage controller in a clustered storage system comprising a plurality of interconnected storage controllers. The storage controller comprises a fast path I/O request processing circuit adapted to process a fast path I/O request directed to a device identified in the fast path I/O request and a logical volume I/O request processing stack adapted to process a logical I/O request directed to a device identified in the logical I/O request. The controller further comprises control logic coupled with the fast path I/O request processing circuit and coupled with the logical volume I/O request processing stack. The control logic is adapted to determine whether an I/O request received from the attached host system is a fast path I/O request or a logical I/O request. The control logic is further adapted to route the I/O request to the fast path I/O request processing circuit responsive to determining that the I/O request is fast path I/O request. The control logic is further adapted to route the I/O request to the logical volume I/O request processing stack responsive to determining that the I/O request is a logical I/O request. The control logic is further adapted to detect that configuration information relating to the device has changed.

Responsive to detecting change of configuration relating to the device, the control logic is further adapted to convert a fast path I/O request into a converted logical volume I/O request and to ship the converted logical volume I/O request within the clustered storage system for processing to completion.

Yet another aspect hereof provides a method in a clustered storage system comprising a plurality of storage controllers. The method is operable in a storage controller for processing an I/O request. The method comprises receiving an I/O request directed to a device from an attached host system. The I/O request comprises indicia that it should be processed by a fast path I/O request processing circuit of the storage controller rather than a logical volume I/O request processing stack of the storage controller. The I/O request further comprises mapping context information indicative of logical to physical mapping information used by the host system to generate the I/O request. The method then determines from the mapping context information that the I/O request was generated by the host system using stale logical to physical mapping information. The method further comprises converting the I/O request to a converted logical volume I/O request and shipping the converted logical volume I/O request within the clustered storage system for processing to completion.

DETAILED DESCRIPTION OF THE DRAWINGS

Figure 1:
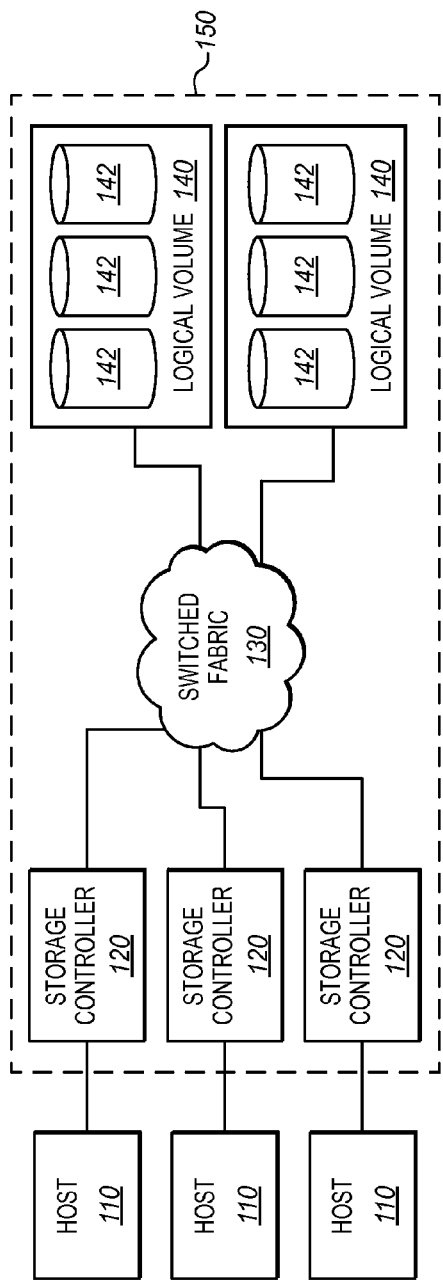
FIG. 1 is a block diagram illustrating an example of a prior art clustered storage system.
Figure 2:
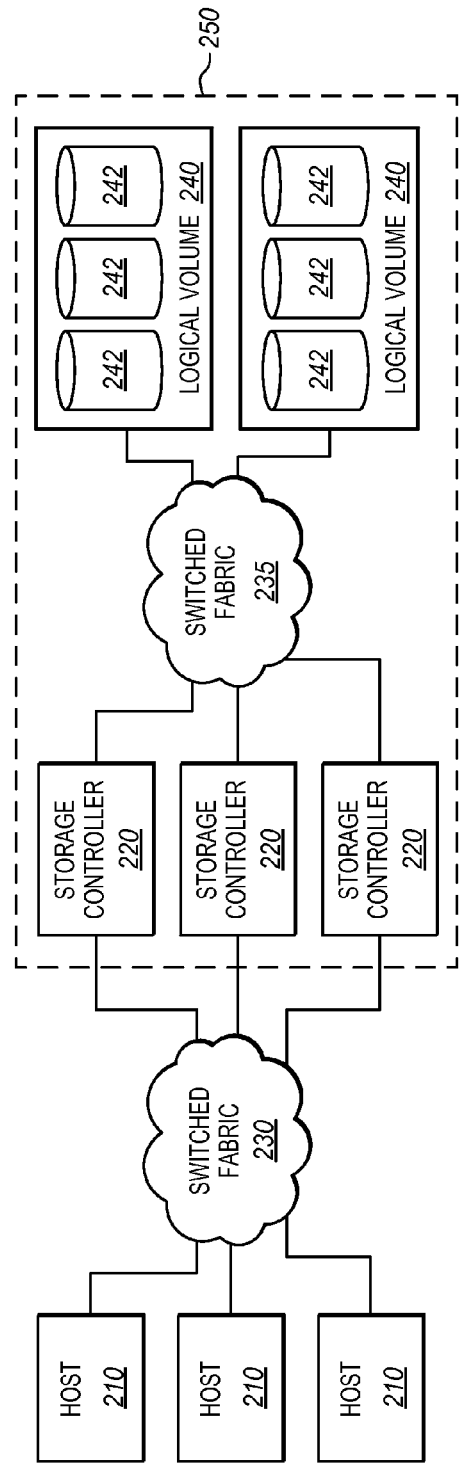
FIG. 2 is a block diagram illustrating another example of a prior art clustered storage system.
Figure 3:
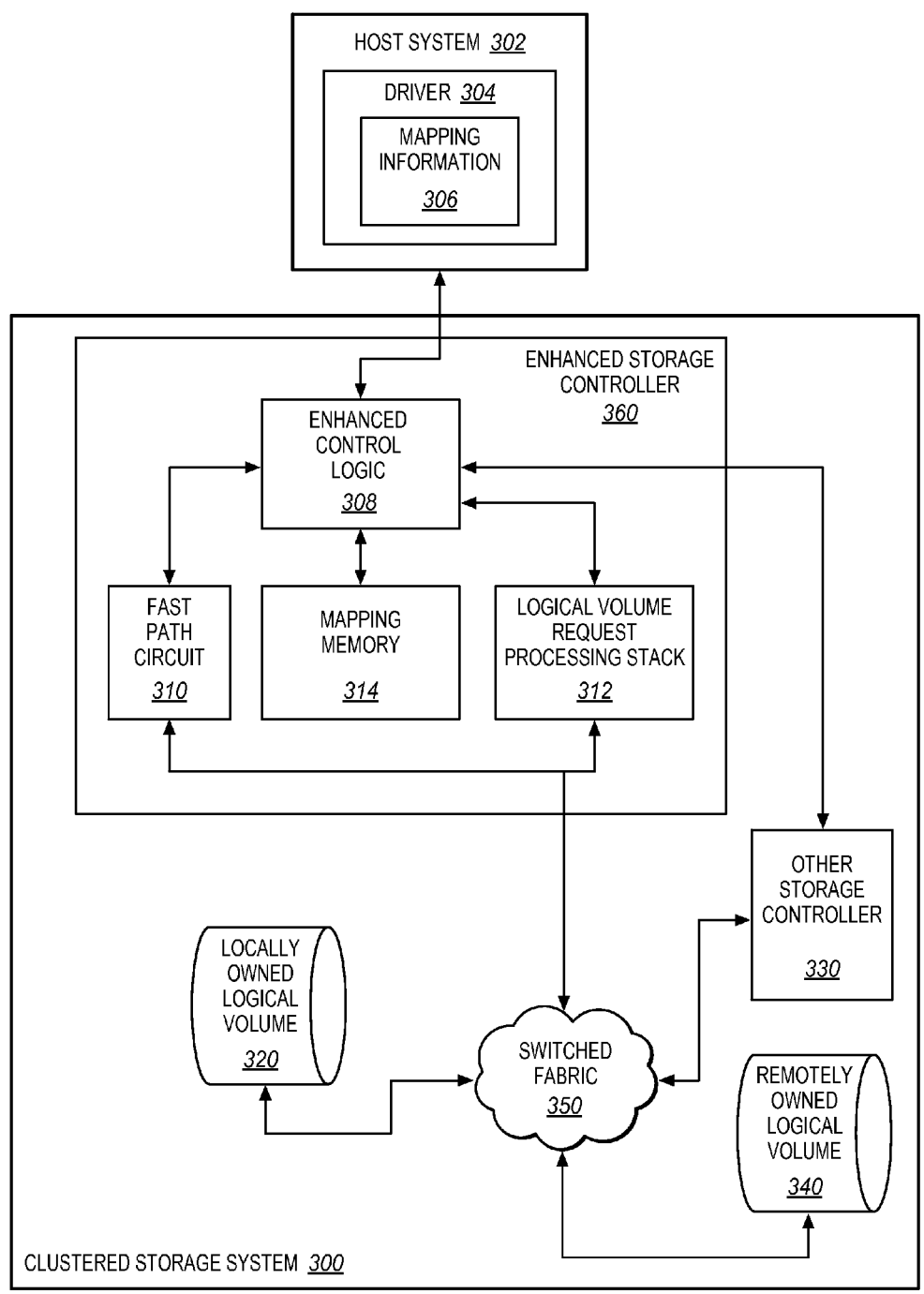
FIG. 3 is a block diagram of an exemplary enhanced clustered storage system having a storage controller enhanced in accordance with features and aspects hereof to improve processing of fast path I/O requests among the controllers of the clustered storage system.

FIG. 3 is a block diagram of a clustered storage system 300 enhanced in accordance with features and aspects hereof to process fast path I/O requests within the system. System 300 comprises one or more host systems 302 coupled with an enhanced storage controller 360 to access one or more logical volumes 320 and 340 through a switched fabric 350 communication medium. Host system 302 may comprise any computing device or server that generates I/O requests directed to controller 360 for access to a logical volume 320 or 340. Switched fabric 350 may be any suitable communication medium and protocol allowing coupling of controller 360 with a plurality of storage devices that provision one or more logical volumes (e.g., volumes 320 and 340). Further, switched fabric 350 enables inter-controller communication among all of the plurality of storage controllers of system 300. For example, enhanced storage controller 360 and other storage controller 330 may exchange information via their respective connections to switched fabric 350. Switched fabric 350 may comprise, for example, a serial attached SCSI (SAS) fabric, an Ethernet fabric, a Fibre Channel fabric, etc. Logical volume 320 is provisioned by portions of one or more storage devices (not shown). In like manner, logical line 340 is provisioned by portions of one or more storage devices (not shown). The storage devices may comprise any mix of suitable devices including optical and magnetic disk drives, solid-state drives, etc. All such storage devices of system 300 are coupled through switched fabric 350 to permit any storage controller to access any of the storage devices and hence any of the logical volumes provisioned thereon.

It will be recognized by those of ordinary skill in the art that inter-controller communications (e.g., between controllers 330 and 360) may utilize other communication media such as a switched fabric coupling the controllers with host systems or a dedicated communication channel (e.g., Infiniband, etc.).

As noted above in a clustered storage system, each logical volume 320 and 340 is logically owned by a corresponding one of the multiple storage controllers. For example, as shown in FIG. 3, enhanced storage controller 360 is designated as the present owner of logical volume 320 while other storage controller 330 may be designated as the present owner of logical volume 340. As generally known in the art of clustered storage systems and as discussed herein above, ownership may be transferred ownership of a logical volume may be transferred among various storage controllers for purposes of load balancing and/or in case of a planned or unplanned failover of a storage controller that presently owns one or more logical volumes.

Storage controller 360 is enhanced in accordance with features and aspects hereof to process fast path I/O requests within controllers of the clustered storage system. As noted above, fast path I/O requests may be constructed by a suitable driver 304 operable within host system 302 based on mapping information 306. Mapping information 306 may be stored in a memory of host system 302 and may comprise information received from storage controllers of system 300 indicative of logical to physical mapping of logical volumes to physical storage devices. The mapping information may further comprise ownership information regarding the present ownership of logical volumes and devices defined in the mapping information. More generally, mapping information and/or ownership information may be referred to herein as configuration information relating to a device/volume of the system.

Utilizing such mapping information, driver 304 may construct fast path I/O requests directed to enhanced storage controller 360. A fast path I/O request is received by control logic 308 of enhanced storage controller 360. The I/O request may be identified as a fast path request by suitable indicia within the received I/O request. Responsive to detecting that the received request is a fast path I/O request, the request is directed to fast path I/O request processing circuit 310 of controller 360 for rapid execution. Other requests received by control logic 308 from host system 302 that are not fast path requests (i.e., logical volume I/O requests) are directed by control logic 308 to logical volume request processing stack 312 for processing.

Fast path I/O request processing circuit 310 may be any suitable circuit specifically designed for rapid execution of an I/O request directed to one or more specific identified physical storage devices (e.g., rather than directed to a logical volume). Utilizing mapping information 306, driver 304 of host system 302 may construct a fast path I/O request to bypass the complex processing within logical volume I/O request processing stack 312. For example, where a logical volume 320 is a RAID logical volume, the mapping information 306 may provide driver 304 with all information required to generate requisite RAID storage management (e.g., striping and/or redundancy information). Thus, the request may be generated as a fast path I/O request for more rapid execution by storage controller 360 by forwarding the request to fast path I/O request processing circuit 310. LSI Corporation is a supplier for exemplary fast path I/O request processing circuit 310 such as may be integrated into the LSI MegaRAID 9280 and 9285 RAID controllers. Other vendors may produce similar circuits and storage controllers comprising customized circuits for rapidly executing common I/O requests directed to specific storage devices rather than logical volumes.

Logical volume I/O request processing stack 312 generally comprises programmed instructions to be executed by an appropriate processor of controller 360 for performing requisite RAID or other logical volume storage management to access identified data. For example, RAID striping and redundancy management may be performed by logical volume I/O request processing stack 312. In some embodiments, logical volume I/O request processing stack 312 may also comprise assist circuitry to aid the programmed instructions for more rapidly performing the logical to physical mapping and/or redundancy computations required for logical volume storage management (e.g., for RAID storage management). "Stack" as used herein (with reference to stack 312) refers to a common design approach for processing of logical volume I/O request where a hierarchy of layers of management software are operable within controller 360 to process such a request. For example, in the context of an I/O request directed to a RAID logical volume, a RAID management layer of the stack may process logical to physical mapping for the addresses identified in the logical volume I/O request. A physical device management layer may manage aspects of control and status of the physical devices that comprise an addressed logical volume. Other layers may be present for error recovery, etc. Thus the entire "stack" of layers may be involved in the processing of a logical volume I/O request. Most of the layers are implemented as programmed instructions. Some or all of the layers may also utilize assist circuitry to speed up processing (i.e., RAID parity assist circuits, DMA circuits, etc.).

Mapping memory 314 of controller 360 comprises any suitable memory device for storing mapping/ownership information regarding logical volumes and/or devices in the system (e.g., "configuration information"). In general, stored ownership information may comprise indicia of ownership for one or more logical volumes known to storage controller 360. As is generally known in the art of clustered storage systems, all storage controllers of the system may share ownership information identifying which of the plurality of controllers presently owns each logical volume defined within the system. Information stored in mapping memory 314 may also comprise logical to physical mapping information useful in processing I/O requests directed to logical volumes for execution by logical volume I/O request processing stack 312.

In operation, control logic 308 receives an I/O request from attached host system 302. The I/O request is generated by driver 304 within host system 302 and may be generated either as a logical volume I/O request or as a fast path I/O request. Control logic 308 determines whether controller 360 is presently capable of processing the received request. For example, if controller 360 is not the present owner of the device or volume to which the request is directed, then controller 360 is not capable of processing the received request. Or, for example, if the request is a fast path request and the fast path processing circuit of controller 360 is presently disabled (as discussed below) then controller 360 is not capable of processing the received request as it was received. In general, if controller 360 is capable of processing the request and the request is properly generated (as discussed below), the request will be processed in accordance with standard processing features of controller 360 (e.g., processed by fast path I/O request processing circuit 310 or by logical volume request processing stack 312).

Further, though controller 360 may be capable of processing the received request, control logic 308 may make a further determination as to whether a received fast path request was generated by driver 304 using up to date mapping information. Since mapping information 306 of driver 304 must be synchronized with the mapping information shared among the storage controllers (e.g., 330 and 360) of the clustered storage system, it is possible that mapping information 306 may be out of date ("stale") at the time the received fast path request was generated. Though careful design may be employed to minimize the window of time during which any host system driver 304 may have and utilize such stale mapping information, there typically remains a time window during which the driver may generate an I/O request (e.g., fast path requests) using stale mapping information.

Confronted with a fast path I/O request generated using stale mapping information, prior techniques may simply discard such a request (e.g., returning an appropriate error status to the requesting host system). By contrast, controller 360 is enhanced in accordance with features and aspects hereof to process such a request despite the use of stale mapping information by the requesting driver module. More specifically, controller 360 is operable to determine whether fast path I/O request processing circuit 310 is capable of processing a received fast path I/O request. If the received fast path I/O request was generated by driver 304 using stale mapping information 306, then the fast path circuit cannot process the request. Instead, controller 360 (e.g., by operation of control logic 308) is operable to convert/translate the received fast path I/O request into a converted logical volume I/O request. The converted logical volume I/O request may then be processed by an appropriate logical volume request processing stack (i.e., stack 312 of controller 360 or an equivalent stack of another controller that is the present owner of the addressed device/volume). Control logic 308 determines whether the I/O request was generated using stale mapping information by inspecting mapping context information included with the request. Further, the mapping context information provides sufficient details to allow control logic 308 to "reverse" the logical to physical mapping process performed by driver 304 using stale mapping information to thereby reconstruct an equivalent logical volume request corresponding to the received fast path I/O request. Control logic 308 then converts the reconstructed logical volume request into the converted logical volume I/O request using up to date mapping information.

If controller 360 is not at present the owner of the addressed device/volume, the converted request is then transmitted (e.g., shipped, transferred, etc.) to other storage controller 330 as indicated by dashed line 352 (i.e., transferred to the controller that presently owns the device). As is generally discussed in a variety of the related patents noted above, such a shipped I/O request may be completed with assistance from controller 360 utilizing DMA features to exchange data associated with the shipped request between other storage controller 330 and host system 302. Further, completion status information generated by other storage controller 330 upon completion of the shipped request may be returned to system 302 via controller 360.

Where the received request is a fast path I/O request, control logic 308 converts the fast path I/O request into a converted logical volume I/O request based on mapping context information received in a portion of the I/O request generated by driver 304. Mapping context information is supplied by driver 304 in the I/O request and is generated by driver 304 based on mapping information 306. Such mapping context information provides sufficient logical to physical mapping information for control logic 308 to convert the fast path I/O request into a corresponding request directed to an identified logical volume. For example, the mapping context information may comprise relevant portions of the logical to physical mapping information utilized by driver 304 to enable control logic 308 to "reverse" the mapping process of driver 304 so as to generate a corresponding logical volume I/O request based on the fast path I/O request directed to a specific one or more storage devices.

Mapping context information may be embedded within an I/O request in any suitable manner. In some exemplary embodiments, an I/O request may comprise a structured message that includes a number of fields and substructures. For example, a basic SCSI command descriptor block (CDB) may be included in the I/O request structure. Where DMA capabilities are utilized to exchange data associated with a request between the memory of the requesting host and the storage controller receiving the request, the I/O request structure may comprise scatter-gather list information for operation of the DMA features of the storage controller. Still further, with respect to features and aspects hereof, the I/O request structure may comprise a mapping information substructure.

The following exemplary pseudo-code structures suggest an exemplary structure for an I/O request that includes embedded mapping context information. It will be readily recognized that in many embodiments, significant additional information will be useful in such an I/O request structure. Such additional information is unrelated to features and aspects hereof and thus are omitted herein for simplicity and brevity of this discussion.

corresponding physical storage devices. Further details of such operational features are discussed herein below with respect to other figures. Those of ordinary skill in the art will readily recognize numerous additional and equivalent elements that may be present in a fully functional enhanced storage controller 360. Such additional and equivalent elements are omitted herein for simplicity and brevity of this discussion.

Figure 4:
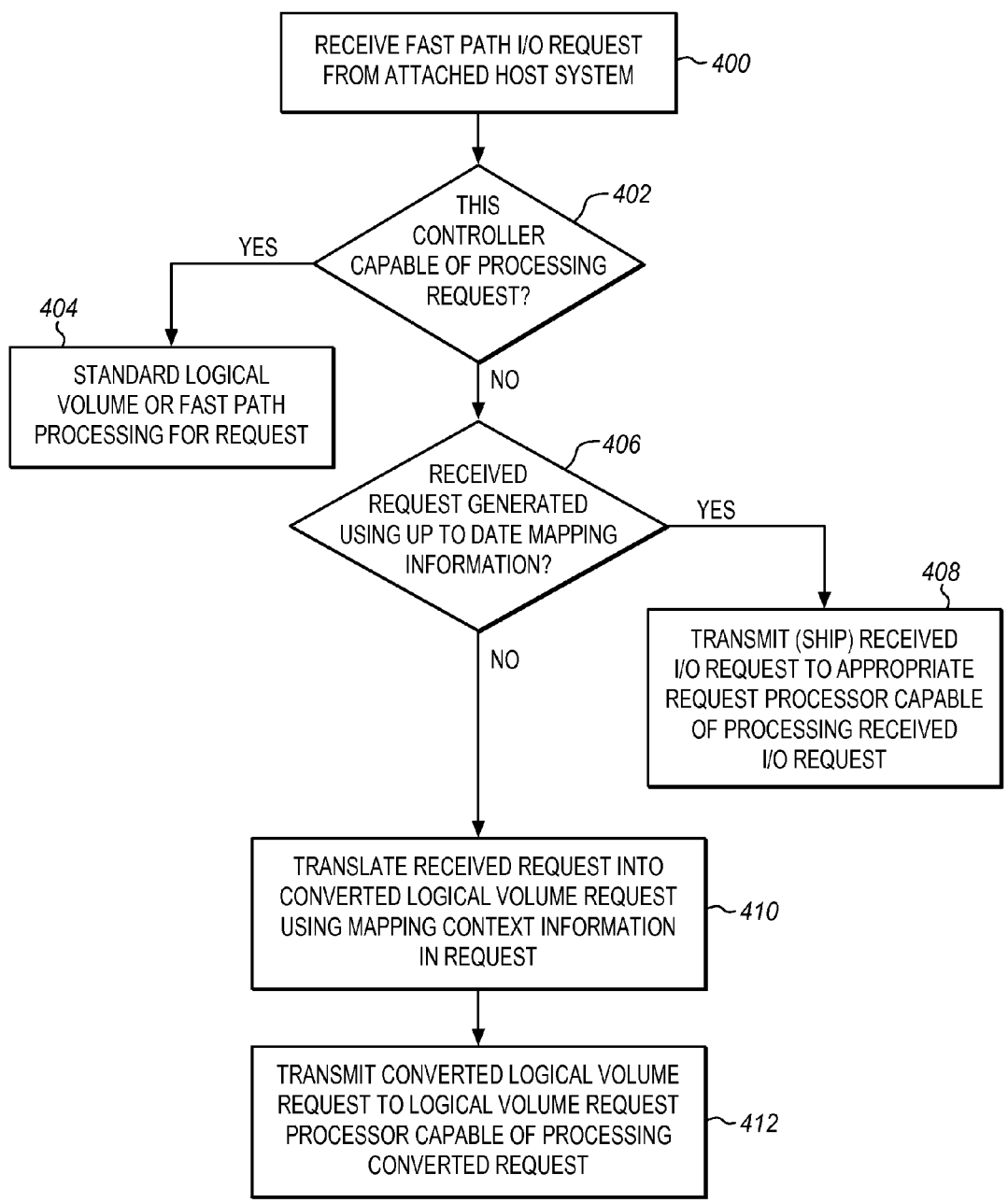
FIGS. 4 through 7 are flowcharts describing exemplary methods operable in a clustered storage system such as FIG. 3 for improved processing of fast path I/O requests among the controllers of the clustered storage system.

FIG. 4 is a flowchart describing an exemplary method in accordance with features and aspects hereof to process I/O requests (e.g., fast path I/O requests). The method of FIG. 4 may be operable in an enhanced storage system such as the system 300 of FIG. 3 and, more specifically, may be operable in control logic 308 of controller 360 of FIG. 3. At step 400, control logic of the enhanced storage controller receives a fast path I/O request from an attached host system. Step 402 next determines whether the controller receiving the request is capable of processing the request. For example, if the received request is a fast path I/O request and fast path processing of the controller is presently disabled (for reasons as discussed below) then the controller receiving the request is not capable of processing the request. Or, if a received fast path request indicates that it was generated using outdated mapping information, then this controller is not capable of processing the request. If this controller is capable of processing the request, step 404 represents standard processing by the controller to process the request (by operation of this controller to complete the request or to ship the request to another controller that presently owns the addressed volume or device. The identified device may be a physical storage device (e.g., for a fast path request) or a logical volume (e.g., for a logical volume request). Where the received I/O request is a logical volume I/O request and this controller owns the

```
typedef struct __IO__REQUEST
{
    U16               DevHandle;          /* A device identifier to which
                                             the request is directed */
    SCSI_IO_CDB_UNION CDB;                /* The SCSI CDB describing the
                                             operation to be performed */
    MAPPING_CONTEXT_INFO CTX;             /* Mapping information */
    SG _UNION         SGL;                /* DMA scatter-gather list */
} IO_REQUEST
    typedef struct __MAPPING_CONTEXT_INFO {
        REG_LOCK_STRUCT  regLockInfo;     /* Region lock information *
        U16    ldTargetId;                /* Target ID of logical volume */
        U8     RAIDFlags;                 /* RAID management level */
        U16    configSeqNum;              /* Version of mapping info used
*/
} MAPPING_CONTEXT_INFO
```

Control logic 308 is further operable to synchronize updated mapping information stored in its mapping memory 314 with the mapping information 306 utilized within host system 302. Responsive to sensing a change in the mapping information for one or more logical volumes of a clustered storage system (and/or a change of ownership information), control logic 308 distributes up to date mapping information to host systems 302 coupled with controller 360. Control logic 308 may be further operable to convert other previously received (i.e., queued for processing) fast path I/O requests or previously received (i.e., queued for processing) logical volume I/O requests into converted logical volume I/O requests. For example, where previously received requests are queued within controller 360 for eventual execution by either fast path circuit 310 or logical volume request processing stack 312, such queued requests may be converted by control logic 308 for shipping to a new owner of a logical volume and its addressed volume, standard processing comprises forwarding the request to the logical volume I/O request processing stack of the controller. Where the received I/O request is a fast path I/O request and this controller owns the addressed device, standard processing comprises forwarding the received request to the fast path I/O request processing circuit of the controller. If this controller is not presently the owner of the device or volume identified in the received I/O request, standard processing may comprise shipping the request to another controller that presently owns the addressed device or volume.

If this controller is not capable of processing the request, step 406 next determines whether a received fast path I/O request was generated using up to date mapping and ownership information. If so (i.e., the received request was generated with up to date mapping information but for any of several reasons this controller's fast path processor is incapable of processing the request at this time), step 408 represents suitable processing to transmit (ship) this request to some other controller or request processor that is capable of processing the received request. For example, the fast path request may be shipped to the fast path I/O request processor of another storage controller that presently owns the addressed storage device. Or, for example, step 408 may convert a fast path request to a corresponding logical volume request and process the converted request by operation of the logical volume I/O request processing stack of this controller.

If step 406 determines that the received fast path request was generated with outdated mapping information, step 410 converts (translates) the received logical volume I/O request into a converted logical volume I/O request based on the mapping context information included in the received I/O request and/or based on information in the controller's mapping information memory.

The mapping context information relied upon by processing of both steps 406 and 410, as described above, comprises any required information to enable the controller to convert a received I/O request into a logical volume I/O request to be directed to another controller or request processor that presently owns the identified device. For the received fast path I/O request, the conversion process utilizes the mapping context information to convert the fast path I/O request into a corresponding, converted logical volume I/O request that effectuates the same requested access to a storage device but does so by directing a request to a logical volume. Further, the converted logical volume I/O request will be directed to the destination target address of the storage controller that presently owns the storage device identified in the initially received fast path I/O request. Step 412 then transmits (e.g., "ships") the converted logical volume I/O request to the storage controller that presently owns the device identified by the originally received I/O request. The other controller then executes the converted logical volume request using its logical volume I/O request processing stack.

Figure 5:
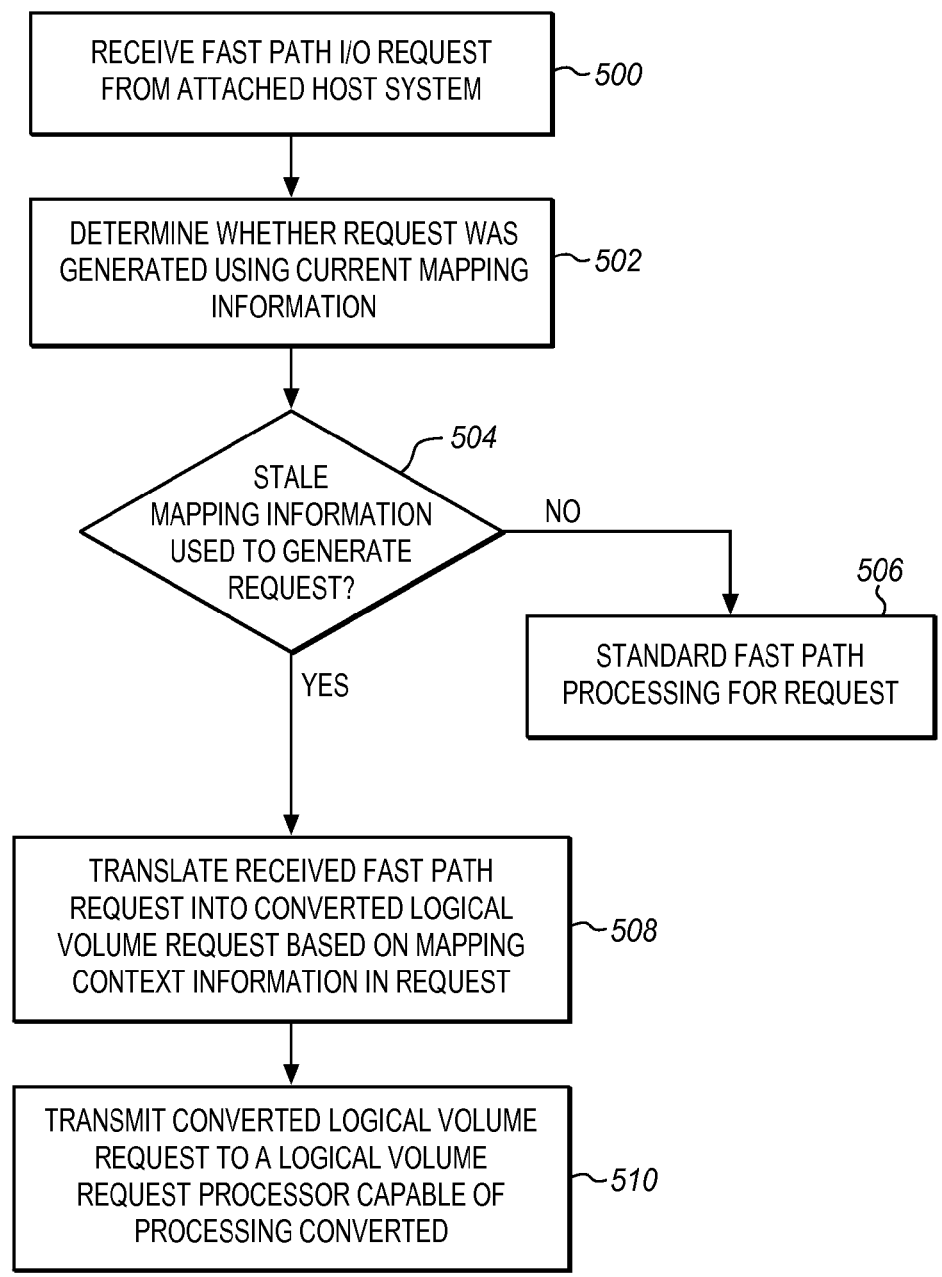

FIG. 5 is a flowchart describing another exemplary method for improved shipping of fast path I/O requests among controllers of a clustered storage system in accordance with features and aspects hereof. The method of FIG. 5 may be operable in an enhanced clustered storage system such as system 300 of FIG. 3 and more specifically may be operable within enhanced control logic 308 of enhanced storage controller 360 of FIG. 3. At step 500, a fast path I/O request is received from an attached host system. The fast path characteristic of the received I/O request may be indicated by suitable flags or other indicia within the received I/O request. At step 502, control logic of the controller receiving the request determines whether the mapping context information included with the received fast path request indicates that up to date mapping information was used by the host system (driver) to generate the fast path request. If the mapping context information of the received fast path request is not stale (as determined by step 504), step 506 represents standard fast path I/O request processing within this storage controller. As noted above, such processing generally comprises forwarding the received fast path I/O request to a fast path I/O request processing circuit of this storage controller for rapid completion of the received I/O request. If step 504 determines that stale mapping information was used by the host system driver to generate the fast path request, step 508 translates the fast path request into a converted logical volume I/O request and step 510 transfers the converted logical volume I/O request within the clustered storage system for further processing. Transferring of the request by step 510 may comprise transferring the request to the logical volume I/O request processing stack of this controller for processing or may comprise transferring the converted logical volume I/O request to the logical volume I/O request processing stack of another storage controller that presently owns the addressed device.

Figure 6:
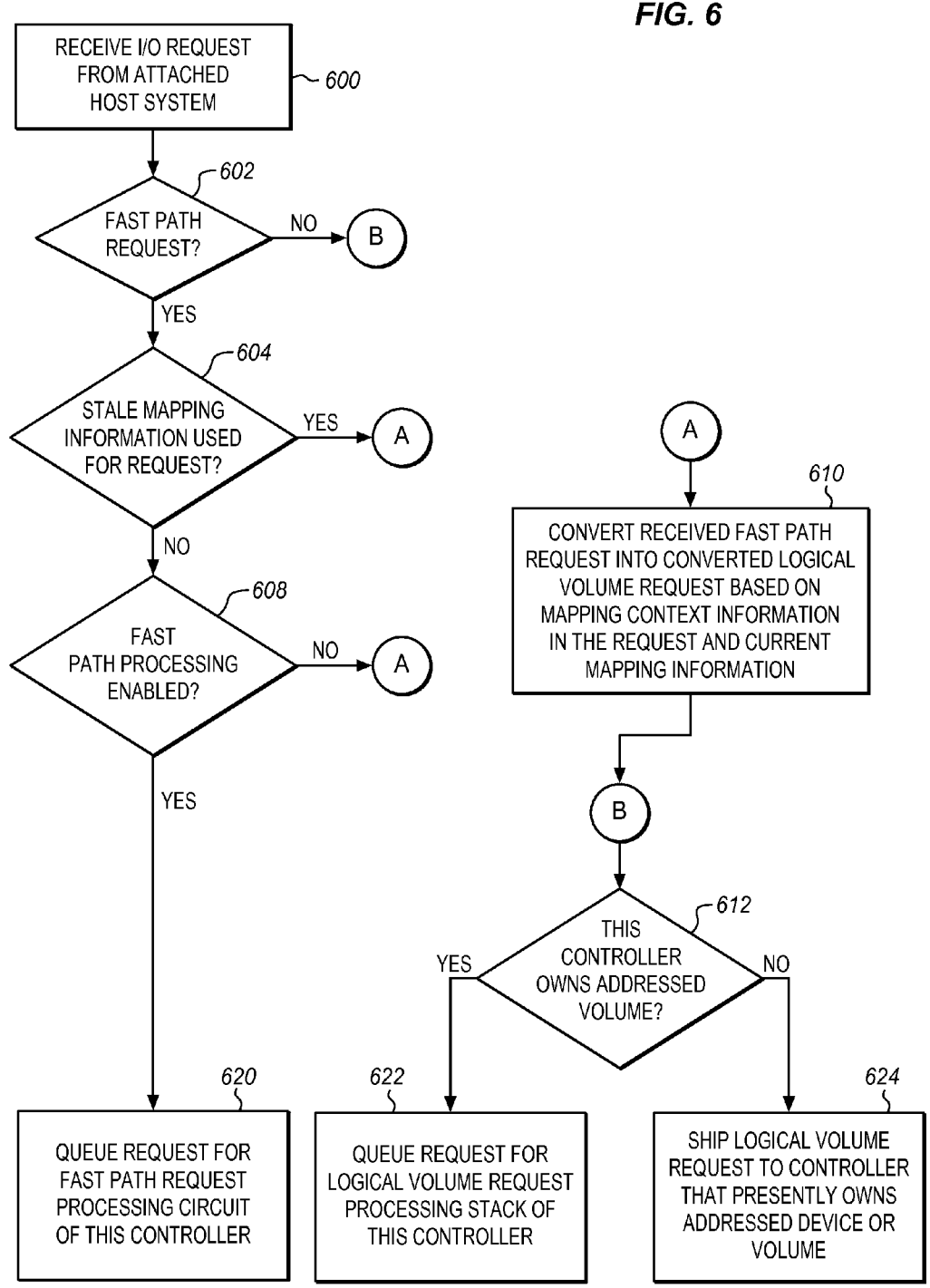

FIG. 6 is a flowchart describing another exemplary method in accordance with features and aspects hereof to improve processing and/or shipping of received I/O requests including fast path I/O requests. The method of FIG. 6 may be operable in an enhanced clustered storage system such as system 300 of FIG. 3 and more specifically may be operable in enhanced control logic 308 of enhanced storage controller 360 of FIG. 3. At step 600, an I/O request is received from an attached host system. Step 602 next determines whether the received request is a fast path request. If not (i.e., the request is a logical volume I/O request), processing continues at step 612 (label "B") to determine whether this controller presently owns the logical volume addressed by the received request. If this controller presently owns the addressed logical volume, step 622 queues the logical volume I/O request for processing by the logical volume I/O request processing stack of this controller. Otherwise (if this controller does not own the addressed logical volume), step 624 ships (transmits) this logical volume I/O request to another storage controller that presently owns the addressed logical volume.

If step 602 determined that the received request was a fast path I/O request, step 604 next determines whether the mapping information used by the host system driver to generate the fast path request was "stale" (i.e., out of date or superseded by newer mapping information known to the controller but not yet synchronized to the host system driver). The determination is made by inspection of mapping context information included with the received fast path request. If the mapping information used to generate the fast path request is stale, processing continues at step 610 (label "A") to convert the received request into a converted logical volume I/O request. The conversion process of step 610 is based on the stale mapping context information in the request and current mapping information known to the storage controller. The method then continues to process the converted logical volume request at step 612 (label "B") as discussed above.

If step 604 determined that the mapping information used by the host system to generate the fast path request was not stale, step 608 next determines whether processing by the fast path I/O request processing circuit of this controller is presently enabled. As discussed further herein below, certain changes in the configuration of the clustered storage system may cause the fast path processing circuit to be temporarily disabled while the storage controllers and host system re-synchronize their mapping information. If step 608 determines that the fast path processing circuit of this storage controller is presently disabled, the method continues at step 610 (label "A") as discussed above, to convert the fast path request into a converted logical volume I/O request and to ship/transmit that converted request within the system for further processing.

Finally, if step 608 determines that the fast path I/O request processing circuit of this controller is presently enabled for processing (and all other tests of the received request passed through to this test), then step 620 queues the received fast path I/O request for processing by the fast path processing circuit of this storage controller. It will be recognized by those skilled in the art that the fast path I/O request may be queued for processing by the fast path I/O request processing circuit of this controller or, for any of various reasons, may be queued for processing by a fast path circuit of another storage controller (by operation of step 620). Reasons for such queuing to another storage controller and the details of such processing are beyond the scope of this discussion.

Figure 7:
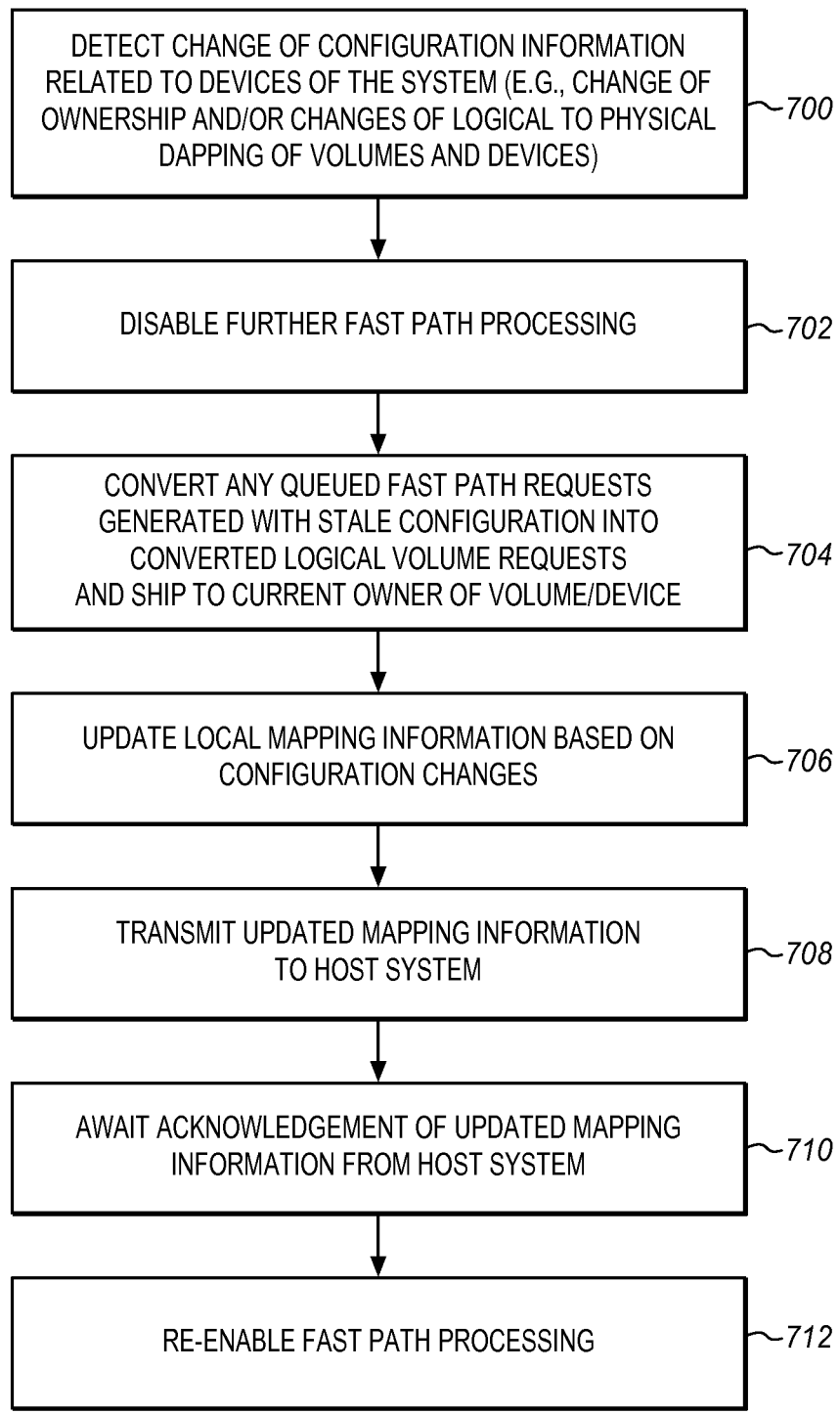

FIG. 7 is a flowchart describing another exemplary method in accordance with features and aspects hereof for improved processing of fast path I/O requests. The method of FIG. 7 is cooperative with the method of FIG. 6 to assure that any presently queued I/O requests within this controller will be properly processed when a change of ownership or other reconfiguration of the clustered storage system is detected. The method of FIG. 7 may be performed within an enhanced storage system such as system 300 of FIG. 3 and more specifically may be performed by suitably enhanced control logic 308 of enhanced storage controller 360 of FIG. 3. Step 700 detects a change of configuration information related to a device/volume of the clustered storage system that may affect processing of fast path I/O requests. As noted above, a change of configuration information may comprise changes of ownership of devices/volumes of the clustered storage system and/or may comprise changes to logical to physical mapping of volumes and devices. Responsive to detecting such a change, step 702 disables further fast path I/O request processing within this controller. Since it is possible that mapping information may change based on the detected change of configuration, the fast path I/O request processing circuit is disabled from processing further received requests until the controller and the host system driver are assured that their respective mapping information is up to date and synchronized. As noted above with respect to FIG. 6, further fast path I/O requests received while the fast path circuit of this controller is disabled will be processed by appropriate conversion and/or other processing with the clustered storage system.

At step 704 all queued requests that may be impacted by a change of configuration are converted into converted logical volume I/O requests and shipped to an appropriate request processor of a storage controller of the clustered storage system. Thus, any queued I/O requests (e.g., queued fast path I/O requests and/or queued logical volume I/O requests) that were generated based on stale or outdated mapping information and that are not yet processed by this controller are converted into corresponding, converted logical volume I/O requests. The converted requests are then transmitted or shipped to an appropriate I/O request processor of a storage controller of the system. For example, queued fast path I/O requests that were generated by a host system using mapping information that is now stale are first converted into corresponding converted logical volume I/O requests as described above such that the controller that presently owns the identified device of the fast path request can process the converted I/O request as a logical volume I/O request. Or, for example, if the mapping information used to generate a fast path request is up to date but ownership of the device has changed, the fast path request may be transmitted/shipped to the new owner of the addressed device.

Step 706 updates local mapping information within this storage controller based on the detected configuration change. As noted above, each storage controller of the clustered storage system comprises a memory for storing mapping and ownership information relating to volumes and/or devices of the system. Such mapping and ownership information is shared among the plurality of storage controllers of the clustered storage system. Step 708 then transmits relevant portions of the updated mapping and ownership information to an attached host system. As noted above, where a host system driver and storage controller are tightly coupled to generate and process fast path I/O requests, the driver of an attached post system utilizes mapping and ownership information to generate such fast path I/O requests. Thus, step 708 attempts to assure that the driver modules of attached host systems receive updated information regarding ownership and mapping of storage devices. Step 710 then awaits receipt of an acknowledgment from any attached host system receiving the transmitted updated mapping and ownership information.

It will be noted that during the period awaiting acknowledgment of receipt of the new mapping/ownership information by the host systems (e.g., a wait at step 710 to synchronize mapping information between the various storage controllers of the clustered storage system and any attached host systems), further fast path I/O processing within this controller has been disabled. Thus, as discussed above with respect to FIG. 6, any further received fast path I/O requests generated by the host system driver before having received the updated mapping and ownership information will be converted by this storage controller into corresponding logical volume I/O requests and, potentially, shipped to a new owning storage controller of the identified device. Following receipt of the acknowledgment from an attached host system by step 710, step 712 re-enables fast path I/O processing for this controller assured with the knowledge that attached host systems have been synchronized as regards ownership and mapping information known to this controller following a change of the detected change of ownership.

Those of ordinary skill in the art will readily recognize numerous additional and equivalent steps and fully functional methods such as those described above with respect to FIGS. 4 through 7. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method comprising:
   receiving, in a storage controller of a clustered storage system, a fast path Input/Output (I/O) request from an attached host, wherein the request includes a device identifier that indicates the device that the request is directed to;
   determining whether the request can be processed by a fast path I/O request processing circuit of the storage controller;
   responsive to determining that the fast path I/O request processing circuit of the storage controller can process the request, processing the request via the fast path I/O request processing circuit of the storage controller to bypass logical to physical mapping computations at the storage controller; and
   responsive to determining that the fast path I/O request processing circuit of the storage controller cannot process the request, transferring the request within the clustered storage system for completion.

2. The method of claim 1
   wherein the step of determining further comprises determining that the fast path I/O request processing circuit of the storage controller is enabled to determine that it can process the fast path I/O request, and wherein the step of transferring further comprises transferring the request to a fast path I/O request processing circuit of another storage controller.

3. The method of claim 1
wherein the received fast path I/O request comprises mapping context information based on logical to physical mapping information used within the host system in generating the fast path I/O request,
wherein the step of transferring further comprises:
transferring the request to a logical volume I/O request processing stack of the controller; and
processing the fast path I/O request by operation of the logical volume I/O request processing stack of the storage controller, wherein the processing is in accordance with the mapping context information.

4. The method of claim 3
wherein the step of processing the fast path I/O request by operation of the logical volume I/O request processing stack further comprises:
generating a logical volume I/O request based on the fast path I/O request and the mapping context information; and
processing the logical volume I/O request by operation of the logical volume I/O request processing stack of the storage controller.

5. The method of claim 1
wherein the received fast path I/O request comprises mapping context information based on logical to physical mapping information used within the host system in generating the fast path I/O request,
wherein the step of transferring the fast path I/O request further comprises:
generating a logical volume I/O request based on the fast path I/O request and the mapping context information; and
shipping the generated logical volume I/O request to another storage controller for processing by operation of the other storage controller.

6. The method of claim 1
wherein the received fast path I/O request comprises mapping context information based on logical to physical mapping information used within the host system in generating the fast path I/O request,
the method further comprising:
determining, based on the mapping context information, whether the logical to physical mapping information used within the host system is current; and
responsive to determining that the logical to physical mapping information is not current, performing the additional steps of:
disabling the fast path I/O request processing circuit of the controller;
responsive to disabling the fast path I/O request processing circuit, processing subsequently received I/O request using a logical volume I/O request processing stack of the controller while the fast path I/O request processing circuit is disabled;
transmitting updated logical to physical mapping information from the storage controller to the host system;
receiving, in the storage controller, acknowledgement of receipt of the updated logical to physical mapping information from the host system; and
responsive to receipt of the acknowledgement, re-enabling the fast path I/O request processing circuit.

7. A storage controller in a clustered storage system comprising a plurality of interconnected storage controllers, the storage controller comprising:
a fast path I/O request processing circuit adapted to process a fast path I/O request directed to a device identified in the fast path I/O request, bypassing logical to physical mapping computations at the storage controller;
a logical volume I/O request processing stack adapted to process a logical I/O request directed to a device identified in the logical I/O request;
control logic coupled with the fast path I/O request processing circuit and coupled with the logical volume I/O request processing stack, the control logic adapted to determine whether an I/O request received from the attached host system is a fast path I/O request or a logical I/O request, the control logic further adapted to route the I/O request to the fast path I/O request processing circuit responsive to determining that the I/O request is a fast path I/O request and adapted to route the I/O request to the logical volume I/O request processing stack responsive to determining that the I/O request is a logical I/O request,
wherein the control logic is further adapted to detect that configuration information relating to the device has changed,
wherein the control logic, responsive to detecting change of configuration relating to the device, is further adapted to convert a fast path I/O request into a converted logical volume I/O request and to ship the converted logical volume I/O request within the clustered storage system for completion.

8. The controller of claim 7
wherein the configuration information comprises one or more of: ownership information relating to the device and logical to physical mapping information relating to the device.

9. The controller of claim 7
wherein the fast path I/O request comprises mapping context information based on logical to physical mapping information used by the host system in generating the fast path I/O request, and
wherein the control logic is further adapted to convert the previously received fast path I/O request into the converted logical volume I/O request based on the mapping context information.

10. The controller of claim 9
wherein the control logic is further adapted to detect that the storage controller is the present owner of the device, and
wherein the control logic is further adapted to ship the converted logical volume I/O request to the logical volume I/O request processing stack responsive to detecting that the storage controller is the present owner of the device.

11. The controller of claim 9
wherein the control logic is further adapted to detect that another storage controller of the clustered storage system is the present owner of the device, and
wherein the control logic is further adapted to ship the converted logical volume I/O request to said another storage controller responsive to detecting that said another storage controller is the present owner of the device.

12. The controller of claim 7
wherein the control logic is further adapted to update the logical to physical mapping information used by the host system responsive to detecting the change of configuration information relating to the device.

13. The controller of claim 7 wherein, responsive to detecting the change of configuration information relating to the device, the control logic is further adapted:
to disable the further use of the fast path I/O request processing circuit,
to process subsequently received I/O requests using the logical volume I/O request processing stack of the first storage controller while the fast path I/O request processing circuit is disabled,
to transmit updated logical to physical mapping information to the host system,
to receive acknowledgement of receipt of the updated logical to physical mapping information from the host system, and
to re-enable the fast path I/O request processing circuit responsive to receipt of the acknowledgement.

14. The controller of claim 7 further comprising:
a memory coupled with the control logic, the memory adapted to store logical to physical mapping information and adapted to store information indicative of which of the plurality of storage controllers presently owns the device.

15. In a clustered storage system comprising a plurality of storage controllers, a method operable in a storage controller for processing an I/O request, the method comprising:
receiving an I/O request directed to a device from an attached host system, the I/O request comprising indicia that it should be processed by a fast path I/O request processing circuit of the storage controller to bypass logical to physical mapping computations at the storage controller, rather than by a logical volume I/O request processing stack of the storage controller,
wherein the I/O request further comprises mapping context information indicative of logical to physical mapping information used by the host system to generate the I/O request;
determining from the mapping context information that the I/O request was generated by the host system using stale logical to physical mapping information;
converting the I/O request to a converted logical volume I/O request; and
shipping the converted logical volume I/O request within the clustered storage system for processing to completion.

16. The method of claim 15 further comprising:
updating logical to physical mapping information on the attached host system responsive to the determination that the host system's logical to physical mapping information is stale.

17. The method of claim 15 further comprising:
determining that the device is presently owned by another storage controller of the clustered storage system,
wherein the step of shipping further comprises shipping the converted logical volume I/O request to said another storage controller.

18. The method of claim 15 further comprising:
determining that the device is presently owned by the storage controller of the clustered storage system, and
wherein the step of shipping further comprises shipping the converted logical volume I/O request to the logical volume I/O request processing stack of the storage controller.

19. The method of claim 15 wherein the step of converting further comprises converting the I/O request to a converted logical I/O request based on the mapping context information of the I/O request.

20. The method of claim 1, wherein:
determining that the fast path I/O request processing circuit of the storage controller cannot process the fast path I/O request comprises determining that mapping context information used by the fast path I/O request is out of date.

* * * * *